March 2, 1965     E. E. LOVELL     3,171,154
WINDSHIELD WASHER AND WIPER SYSTEM
Filed June 21, 1963     3 Sheets-Sheet 1
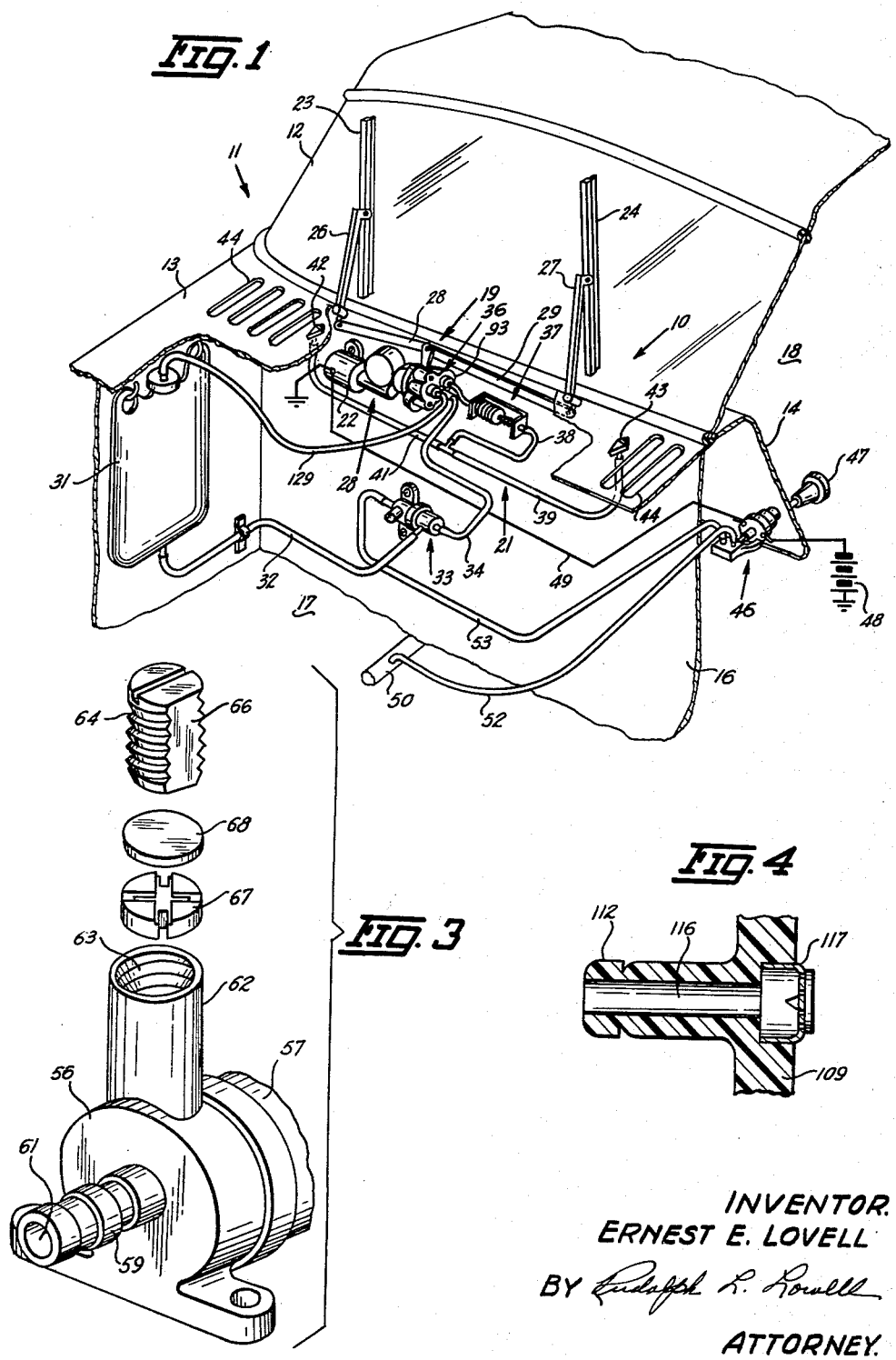
INVENTOR.
ERNEST E. LOVELL
BY Rudolph L. Lowell
ATTORNEY.

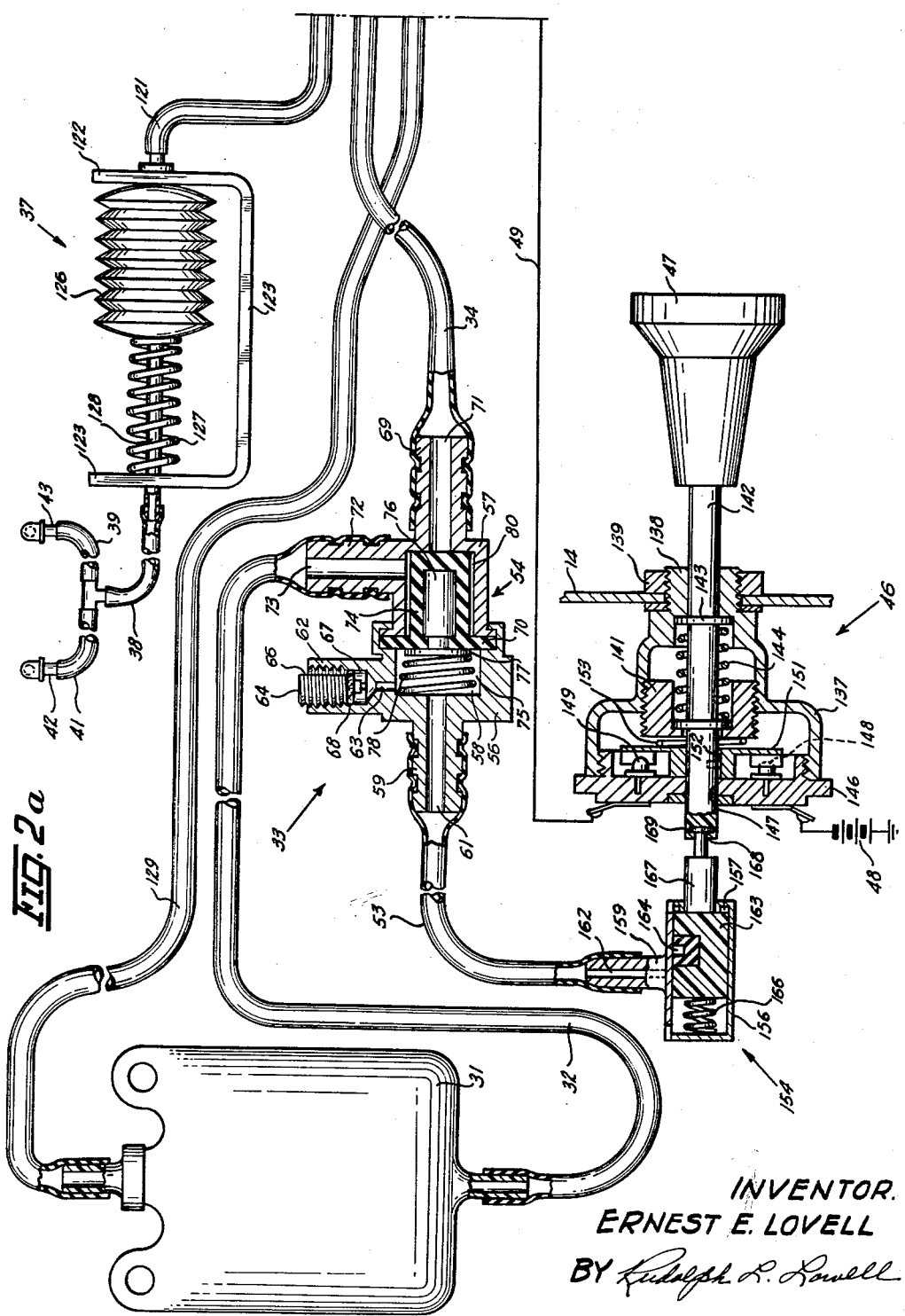

March 2, 1965 E. E. LOVELL 3,171,154
WINDSHIELD WASHER AND WIPER SYSTEM
Filed June 21, 1963 3 Sheets-Sheet 3
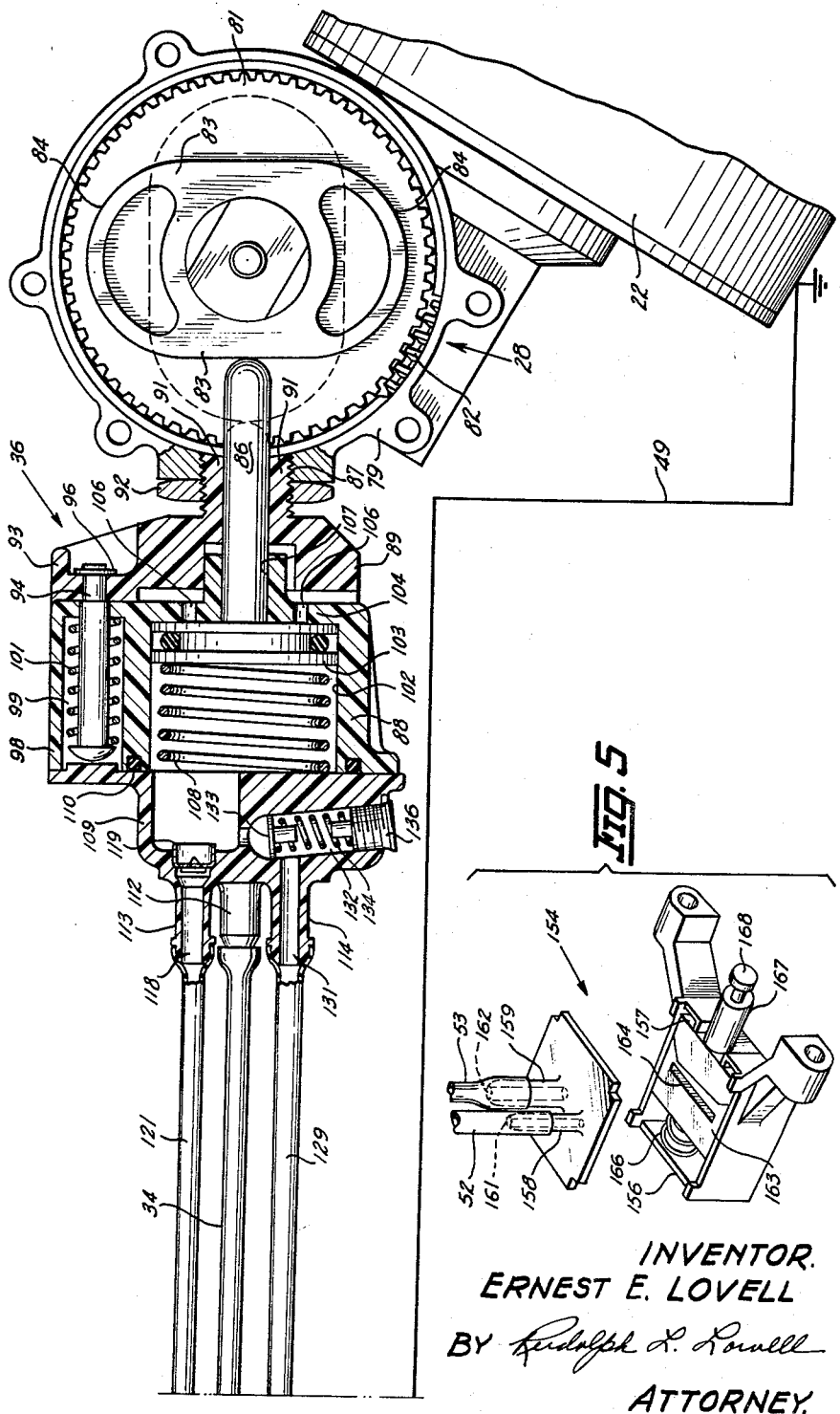
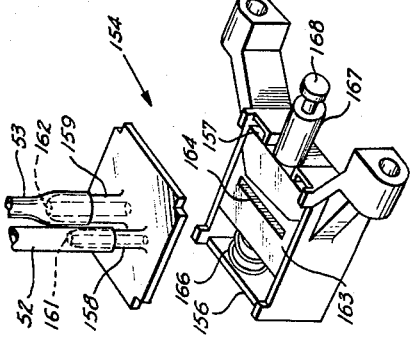
INVENTOR.
ERNEST E. LOVELL
BY *Rudolph L. Lovell*
ATTORNEY.

United States Patent Office 3,171,154
Patented Mar. 2, 1965

3,171,154
WINDSHIELD WASHER AND WIPER SYSTEM
Ernest E. Lovell, Detroit, Mich., assignor to The Delman Company, Cookeville, Tenn., a corporation of Tennessee
Filed June 21, 1963, Ser. No. 289,494
7 Claims. (Cl. 15—250.02)

This invention relates to a windshield washer and wiper system having separate washing and wiping units and more particularly to a control device in combination with the washing unit for regulating the washing cycle of the system.

It is the object of the invention to provide an improved windshield clearing system having an automatic control device which is preset to regulate the washing cycle of the system.

A further object of the invention is to provide in a windshield washing system having a pump and a fluid supply reservoir, an automatic vacuum operated control device for regulating the flow of fluid from the reservoir to the pump.

Another object of the invention is to provide in a windshield washer and wiper system having a wiper motor and a fluid pump, manual actuator means providing for the selective independent or concurrent operation of the wiper motor and the vacuum operated control device which regulates the supply of cleaning fluid for the pump.

Still another object of the invention is to provide a fluid supply control valve for pump means of a windshield washer system wherein the pump means is driven directly from a rotating cam connected to the wiper motor.

An additional object of the invention is to provide a dependable self-contained and compact control device for attaining the above mentioned objects which is economical in cost and effective in service and operation.

These and other objects and advantages of this invention will become readily apparent upon reference to the following description and the annexed drawing, wherein:

FIG. 1 is a fragmentary perspective view of a vehicle showing the windshield cleaning system of the invention in assembled relation therewith;

FIGS. 2a and 2b are diagrammatical representations of the windshield cleaning system of FIG. 1 illustrating in cross section the various components of the system;

FIG. 3 is an enlarged exploded perspective view of an air bleed unit which forms part of the valve means for controlling the liquid flow in the system;

FIG. 4 is an enlarged sectional view of the cleaning fluid inlet nipple and check valve of the pump assembly; and FIG. 5 is an enlarged exploded perspective view of the vacuum control valve assembly.

Referring to the drawing, there is shown in FIG. 1 a windshield clearing system indicated generally by the number 10, in assembled relation with a vehicle 11, such as a passenger car, truck or bus. The vehicle 11 is illustrated as having a windshield 12, an engine cowl 13 extended forwardly of the windshield, and an instrument panel or dashboard 14 positioned below and rearwardly of the windshield. A fire wall 16 extends downwardly from the cowl 13 to separate the engine compartment 17 from the passenger compartment 18.

The windshield clearing system has two basic components, a wiper unit and a washer unit designated generally as 19 and 21, respectively. An electric motor 22 concurrently operates the wiper unit 19 and washer unit 21 in clearing the windshield 12 of foreign materials that are deposited on the outside surface of the windshield.

The wiper unit 19 comprises a pair of wiper elements or blades 23 and 24 in engagement with the windshield 12. The blades 23 and 24 are connected to upwardly extended arms 26 and 27 which are pivotally mounted on the cowl 13 adjacent the bottom edge of the windshield 12. The arms 26 and 27 are oscillated to reciprocate the blades over the windshield 12 by a worm and worm gear assembly 28 connected to the respective arms by a crank linkage 29. The electric motor 22 drives the worm of the worm gear assembly 28.

The windshield washer unit 21 has a flexible bag-type fluid container or reservoir 31 mounted in the engine compartment 17 forwardly of the fire wall 16. From the reservoir 31 the cleaning fluid is directed through a hose 32 through a control valve 33 which operates to control the flow of fluid from the reservoir 31. A hose 34 connects the valve 33 with a reciprocating pump 36 drivably connected to the worm and worm gear assembly 28 by a rotatable cam 83. The pump 36 discharges the cleaning fluid under pressure to a pulse converter unit 37 which changes the intermittent flow of the cleaning fluid into a steady pressurized flow. From the pulse converter unit hoses 38, 39 and 41 direct the cleaning fluid under pressure to a pair of nozzles 42 and 43 mounted on the cowl 13. The nozzles 32 and 43 extend in a rearward direction through heating and ventilating openings 44 in the cowl 13.

A combined electric and vacuum control switch 46 is mounted on the dashboard 14. The switch 46 has a control knob 47 which is rotatable to connect a battery 48 to an electrical conductor 49 leading to the electric motor 22 thereby connecting the motor 22 to the battery 48. When the control knob 47 is moved in a linear direction the switch 46 connects the control valve 33 to a source of vacuum pressure, such as the air intake manifold 50 of the engine (not shown), by means of flexible hoses 52 and 53.

As shown in FIG. 2a, the control valve 33 comprises an elongated housing 54 having a vacuum section 56 and a cleaning fluid section 57 defining an elongated cylindrical chamber 58. The vacuum section 56 has a hose connection 59 forming a passage 61 opening into one end of the chamber 58. The hose 53 is positioned about the connection 59. A transverse boss 62 has a bleed passage 63 opening into the chamber 58. Referring to FIG. 3, a portion of the bleed passage 63 is enlarged and threaded to receive a bleed screw 64 having a flat side 66. A slotted brass disc 67 and a felt washer 68 are disposed in the bleed passage 63 and retained therein by the bleed screw 64. Adjustment of the screw 64 regulates the bleed characteristics of the passage 63.

The fluid section 57 of the housing 54 has a longitudinal hose connection 69 provided with an outlet passage 71 and a transverse house connection 72 having an inlet passage 73. The hose 32 is positioned about the connection 72 and hose 34 is positioned about the connection 69. The passages 71 and 73 have one of their ends open to the chamber 58, with the end of the passage 71 open to the end wall of the chamber 58 and the end of the passage 73 open to the side wall of the chamber 58.

Mounted within the chamber 58 and extended within the cleaning fluid section 57 is a resilient valve member 74 of a cylindrical shape having a dimension slightly smaller than the chamber 58 and an annular radial flange 70 which is clamped between the housing sections 56 and 57 by crimping or turning over a portion of the housing 56 over flanges of the housing 57. The valve member 74 divides the chamber 58 into a vacuum section 75 and a cleaning fluid section 80. The valve member 74 is normally positioned in engagement with the housing section 57 defining the opening for the outlet passage 71.

In order to reinforce and control the linear movement of the resilient valve member 74 an elongated cylindrical metal core 76 is extended longitudinally within the resilient material. The core 76 has a head 77 which extends into the vacuum section 75 of the chamber 58. A compression spring 78 positioned in the vacuum section 75 of the chamber 58 engages the housing section 56 and the head 77 of the core to continuously bias the value member 74 in engagement with the housing section 57 to close the outlet passage 71.

The worm and worm gear assembly 28 has a housing 79 secured to the motor 22 and the vehicle body by means of bolts (not shown). Mounted within the housing 79 is a rotatable driving gear 81, having teeth engageable with the worm 82 which is connected to the output shaft of the electric motor 22. The gear 81 has a cam member 83 secured to one surface thereof. The cam 83, which has diametrically opposite cam surface 84 designed to contact the pump plunger 86 in a manner to be described, may be integral with the gear 81 or may be a separate element affixed thereto. In practice, it has been found that a plastic material such as hard nylon provides an excellent material for constructing the gear 81 and cam 83. This material lends a certain resiliency to the drive connection and is at the same time, tough enough to withstand wear at the cam surface 84. The gear housing 79 is provided with a threaded opening 87 for the purpose of mounting a housing 88 for the pump 36. The pump housing 88 includes a stationary mounting base 89 which has a hollow threaded projection 91 disposed in the threaded opening 87. The mounting base 89 is locked with the housing 79 by a lock nut 92 threaded on the projection 91.

Referring to FIG. 2b the mounting base 89 has three spaced projections 93, one of which is shown. The cylinder housing 88 has projections 98 around its outer surface which correspond in number to the projections 93 on the mounting base 89. Each projection 98 has a bore 99 into which a post 94 projects. The post 94 extends through the projection 93 and is retained in position by a snap ring 96. A compression spring 101 is interposed between the head of the post 94 and the base of the projection 98 of the housing 88 thereby biasing the housing 88 into engagement with the mounting base 89. The posts 94 and compression spring 101 serve to locate and maintain the pump housing in place on the mounting base 89.

The pump housing 88 further includes a central bore 102 for the reception of a pump piston 103. A bottom wall 104 closes the bottom of the cylinder bore 102 and contains vent openings 106 and a central opening 107 for receiving the pump plunger 86.

A helical compression spring 108 is seated against the working face of the piston 103 and bears against a cover member 109 which is secured to the open top of the cylindrical pump housing 88. An annular seal 110 is positioned in the end wall of the cylinder housing 88 in engagement with the cover member 109 to perfect a fluid type seal between the cover member and the cylinder housing.

The cover member 109 has three hose nipples 112, 113 and 114. The nipple 112 is inserted in the end of the hose 34 to provide a fluid communication between the control valve 33 and the pump 36. The nipple 112 has an inlet passage 116, see FIG. 4, opening into the bore 102 defining the pump chamber. A check valve 117 is mounted in the inlet passage 116 and prevents the back flow of fluid out of the bore 102. The nipple 113 has an outlet passage 118 in fluid communication with the bore 102 and has positioned therein a check valve 119 which prevents the flow of cleaning fluid back to the bore 102. A hose 121 is positioned over the nipple 113 to provide fluid communication to the pulse converter unit 37, which acts to convert the pulsating pressure from the reciprocating piston 103 to a steady stream of liquid under pressure to the nozzles 42 and 43. The pulse converter unit 37 comprises a U-shaped frame having upstanding legs 122 and 123 and a bottom connecting member 124. An expansible bellows 126 is mounted between the upstanding legs 122 and 123 and bears against one of the legs 122 at one end and seats against a compression spring 127 at the other end. The compression spring 127 in turn seats against the opposite leg 123 of the U-shaped member. A rigid pipe 128 is secured to one end of the bellows and is longitudinally extended through a hole in the leg 122 and is permitted to reciprocate with relation to the leg 122. The end of the pipe 128 remote from the bellows 126 is connected to the hose 38 to provide fluid communication between the bellows 126 and the nozzles 42 and 43.

During operation of the reciprocating piston 103 successive pressure pulsations or surges will be produced, and as each pulse is received, the bellows 126 will expand between the legs 122 and 123 compressing the spring 127. After each successive pulsation the pressure established by the reciprocating piston 103 will drop to zero allowing the spring 127 to expand and compress the bellows 126 thereby discharging fluid from the bellows. This action produces pressure pulsation alternately of the pressure pulsations caused by the reciprocating piston 103 thus resulting in a steady flow of fluid under pressure through the nozzles 42 and 43.

As shown in FIG. 2b, the nipple 114 has a by-pass hose 129 which carries excess cleaning fluid back to the reservoir 31. The nipple 114 has a fluid passage 131 connected to the bore 102 by a by-pass passage 132 in the cover member 109. The passage 132 has one end open to the chamber defined by the bore 102. A check valve 133 is positioned in the passage 132 and is normally held in a closed position by a compression spring 134. A screw plug 136 threadedly received in the bore 132 is adjustable to control the bias on the spring 134. When the cleaning fluid pressure in the chamber formed by the bore 102 becomes excessive the check valve 133 is forced against the compression spring 134 opening the passage to the nipple 114 whereby the cleaning fluid flows through the hose 129 back to the reservoir 31.

The combined electric and vacuum switch 46 which is mounted on the dashboard 14 for the convenience of the driver comprises a bell-shaped housing 137 which is fastened to the dashboard 14 by means of a threaded shoulder 138 and a lock nut 139. Located within the housing 137 is a guide member 141 which has a central opening which cooperates with a central opening in the shoulder 138 to provide a bearing support for a rotatable and a reciprocally movable control rod 142. The rod 142 has an annular flange 143 longitudinally positioned between the guide member 141 and the threaded shoulder 138. A helical compression spring 144 is disposed about the rod 142 in engagement with the radial flange 143 and the guide member 141 to bias the rod 142 in an outward direction. A backing plate 146 is threaded into the open end of the bell-shaped housing 137 and has a central opening 147 to accommodate the rod 142.

A pair of electrical contacts 148 and 149 are mounted on the back plate 146 with the contact 148 electrically connected to the battery 48 and the contact 149 electrically connected to the conductor 49. A rotatable bridging element 151 is mounted on the rod 142 by a key and slot connection 152 and is biased toward the back plate 146 by a spring 153 positioned about the shaft 142 between the guide member 141 and the bridging element 151. The key and slot connection 152 between the rod 142 and the bridging element 151 allows the rod to reciprocate in a longitudinal direction relative to the bridging element 151 while at the same time permits the operator to rotate the bridging element 151 into and out of engagement with the electrical contacts 148 and 149 thereby opening and closing the circuit to the electric motor 22.

A vacuum control valve assembly 154 is mounted on the back plate 146 in alignment with the control rod 142 by means of bolts (not shown). Referring to FIG. 5, the control valve assembly 154 comprises a rectangular-shaped housing 156 forming a valve chamber 157 and having a pair of upright hose connectors 158 and 159 having passages 161 and 162, respectively, opening into the chamber 157. The hose 52 from the vacuum source is positioned over the connector 158 whereby the chamber 157 is subjected to a vacuum pressure. The hose 53 is positioned over the hose connector 159 of the valve 33 thereby subjecting the valve 33 to a vacuum pressure.

A slidable valve member 163 having a slot 164 which connects the passages 161 and 162 is positioned in the chamber 157 and operates to connect and disconnect the passage 162 with the source of vacuum pressure. A compression spring 166 interposed in the chamber 157 engages the valve member 163 to bias the valve to an "off" position wherein the slot 164 is out of registration with the passage 162. An arm 167 fastened to the valve member 163 extends through the housing 156 and has a head 168 in locking engagement with the end of the control rod 142. The head 168 is disposed in a slot 169 in the end of the control rod 142 thereby permitting the rod to rotate independently of the valve member 163. When the control rod 142 is moved toward the dashboard 14 the valve member 163 is moved to the "on" position wherein the passages 161 and 162 are in registration with the slot 164 to connect the source of vacuum pressure to the control valve 33.

In use, when wiper operation alone is desired, the operator of the vehicle rotates the control knob 47 to turn the control shaft 142 which carries the bridging element 151 into conductive engagement with the contacts 148 and 149. The bridging element 151 is an electrical conductor and closes the circuit to the electric motor 22. When the electric motor 22 is energized the worm 82 is rotated to drive the gear 81 of the worm and worm gear assembly 28. The rotating gear 81 through the crank linkage 29 and arms 26 and 27 provides for the movement of the wiper blades 23 and 24 over the windshield 12. The wiper blades 23 and 24 will continuously wipe the windshield 12 until the control knob 47 is rotated back to its initial position thereby breaking the circuit to the electric motor 22.

When it is desired to concurrently operate the wiper unit 19 and washer unit 21 the control knob 47 is rotated to move the bridging element 151 into engagement with the electrical contacts 148 and 149 to close the circuit to the wiper motor 22. When the wiper motor 22 is energized the worm gear assembly 28 is driven to move the wiper blades 23 and 24 over the windshield 12 through the crank linkage 29.

The washer unit 21 is operated by depressing or pushing the control knob 47 toward the dashboard 14 against the biasing force of the compression spring 144. Longitudinal movement of the control rod 142 moves the valve member 163 of the vacuum control valve assembly 154 rearward against the compression spring 166. When the slot 164 and the valve member 163 are in registration with the passages 161 and 162 the vacuum pressure from the engine manifold 50 is connected to the control valve 33.

The vacuum pressure in the control valve 33 is confined to the chamber 58 and moves the resilient valve member 74 against the biasing force of the compression spring 78 thereby opening the outlet passage 71 and permitting cleaning fluid to flow through the inlet passage 73 and out through the outlet passage 71 to the pump 36. As long as the vacuum pressure is maintained in the chamber 58 the resilient valve 74 will be in an open position permitting the flow of cleaning fluid from the reservoir 31 to the pump 36. When the operator of the vehicle releases the control knob 47 the compression spring 144 will move the control rod 142 and the valve member 163 to an off position wherein the valve member 163 closes the passage 161 and 162, respectively.

The vacuum pressure in the chamber 58 of the valve 33 is maintained for a predetermined time by the bleed screw 64 which functions to regulate the rate of air flow into the chamber 58 thereby controlling the duration during which the valve member 74 is held in an open position. When a predetermined amount of atmospheric air is bled into the chamber 58 through the passage formed by the flat side 66 of the bleed screw 64 the compression spring 78 biases the resilient valve 74 into engagement with the housing section 57 to close the outlet passage 71.

The hose 34 carries the cleaning fluid from the valve 33 to the inlet connection 112 of the pump 36. The one-way valve 117 in the passage 116 permits the cleaning fluid to flow into the pump chamber formed by the bore 102. The previously energized electric motor 22 drives the gear 81 to continuously rotate the cam 83 which is in sliding engagement with the pump plunger 86. The eccentric cam surface 84 of the cam 83 in engagement with the pump plunger 86 reciprocate the plunger to move the piston 103 in the bore 102 against the force of the compression spring 108. When the piston 103 compresses the spring 108 the fluid in the chamber defined by the bore 102 is forced under pressure through the check valve 119 through the discharge passage 118 where it is carried by the hose 121 to the pulse converter unit 37. The pulse converter unit 37 minimizes the alternating flow of the cleaning fluid to provide a substantially constant flow of cleaning fluid under pressure to the fluid dispensing nozzles 42 and 43 which direct cleaning fluid onto the windshied 12 in the path of the moving wiper blades 23 and 24, resepctively.

If the cleaning fluid pressure developed in the pump chamber of the reciprocating piston 103 exceeds a predetermined amount the check valve 133 will open permitting the fluid to flow through the by-pass bore 132 and the passage 131 and by the means of the hose 129 back to the reservoir 31. If the check valve 133 becomes inoperative or the cleaning fluid becomes frozen, the electric motor 11 will continue to operate the wiper unit as the cam 83 acting on the plunger 86 will move the housing 88 away from the base 89 against the biasing force of the springs 101.

When the valve member 74 of the control valve 33 is in a closed position cleaning fluid from the reservoir 31 does not flow to the pump 36. With the supply of cleaning fluid to the pump 36 cut off the piston 103 will hold the pump plunger 86 out of engagement with the cam 83 as the vacuum pressure in the chamber formed by the piston bore and caused by the intake movement of the piston 103 will prevent further movement of the piston.

In summary, the windshield clearing system has an automatic control device 33 which controls the duration of the washing cycle. The control valve 33 controls the supply of fluid to the pump 36 and thereby regulates the operation of the pump 36. A combined vacuum and electrical switch 46 is selectively operable to connect the electric wiper motor 22 to a battery 48 and connect the control valve 33 to a source of vacuum pressure.

Having thus described the details of the construction and operation of the present invention, it will be readily appreciated by those skilled in the art that the present invention provides novel and useful improvements in windshield washer and wiper systems of the type described. Arrangement and types of structure utilized in this invention may be subjected to numerous modifications well within the purview of this invention and applicant intends only to be limited to a liberal interpretation of the specification and appended claims.

I claim:

1. A windshield washing and wiping system for a vehicle having a windshield and a source of vacuum pressure comprising:
  (a) a wiper unit having wiping means engageable with said windshield and a motor for moving said wiping means relative to said windshield,
  (b) reservoir means for storing a supply of cleaning fluid,
  (c) nozzle means mounted on the vehicle forwardly of the windshield for directing cleaning fluid onto the windshield,
  (d) pump means operated by the motor of said wiper unit for withdrawing cleaning fluid from the reservoir means and discharging the cleaning fluid under pressure to said nozzle means,
  (e) valve means connecting the pump means with the reservoir means, said valve means normally in a closed position preventing the flow of cleaning fluid to said pump means and movable to an open position in response to vacuum pressure to permit the flow of cleaning fluid to said pump means,
  (f) manual actuator means operable to connect and disconnect the motor of the wiper unit to a source of energy and the valve means with said source of vacuum whereby the motor simultaneously operates the pump means and drives the wiping means over the windshield, and
  (g) bleed means operatively associated with said valve means for admitting air to said valve means whereby said valve means is returned to the normally closed position, said bleed means being adjustable to vary the rate of air admitted to said valve means thereby controlling the duration of the dispensing of cleaning fluid onto the windshield.

2. A windshield washing system for a vehicle having a windshield and a source of vacuum pressure comprising:
  (a) reservoir means for storing a supply of cleaning fluid,
  (b) nozzle means mounted on the vehicle forward of the windshield for directing cleaning fluid onto the windshield,
  (c) pump means operable to withdraw said fluid from said reservoir means and discharge fluid under pressure to said nozzle means,
  (d) valve means connecting the pump means with the reservoir means, said valve means normally in a closed position preventing the flow of cleaning fluid to said pump means and movable to an open position in response to vacuum pressure to permit the flow of fluid to said pump means,
  (e) means operable to connect and disconnect the valve means with said source of vacuum pressure thereby moving said valve means to the open position, and
  (f) bleed means operatively associated with said valve means to admit a restricted amount of air to said valve means whereby to retard the movement of said valve means to the normally closed position therefor.

3. A windshield washing system for a vehicle having a windshield and a source of vacuum pressure comprising:
  (a) reservoir means for storing a supply of cleaning fluid,
  (b) nozzle means mounted on the vehicle forward of the windshield for directing cleaning fluid onto the windshield,
  (c) motor means including a driven cam member,
  (d) pump means having a reciprocating member engageable with said cam member and operable to withdraw said cleaning fluid from said reservoir means and discharge fluid under pressure to said nozzle means,
  (e) valve means connecting the pump means with the reservoir means, said valve means normally in a closed position preventing the flow of cleaning fluid to said pump means to provide for the holding of said reciprocating member out of contact with said cam, said valve means movable to an open position in response to a vacuum pressure to permit the flow of fluid to said pump means,
  (f) means operable to connect and disconnect the valve means with said source of vacuum pressure thereby moving said valve means to the open position, and
  (g) bleed means operatively associated with said valve means to admit a restricted amount of air to said valve means whereby to retard the movement of said valve means to the normally closed position therefor.

4. A windshield washer and wiper system comprising:
  (a) a washer unit including pump means with an inlet and an outlet having a reciprocating member operable to displace cleaning fluid through said outlet onto an associated windshield,
  (b) a wiper unit including motor means,
  (c) a rotatable cam member driven by said motor means and engageable with said reciprocating member to operate said pump means concurrently with said wiper unit,
  (d) valve means for selectively closing off the inlet side of said pump means to provide holding force whereby said reciprocating member is held out of contact with said rotating cam, and
  (e) means for delaying the closing of the inlet side of said pump whereby the pump means is operated for a predetermined period of time concurrent with the operation of the wiper unit.

5. In a windshield washer and wiper system,
  (a) motor means including a driven cam member,
  (b) pump means having an inlet and an outlet, and a reciprocating member engageable with said cam member and operable to displace cleaning fluid onto an associated windshield,
  (c) valve means having an open and closed position for regulating the flow of cleaning fluid to the inlet of said pump means, said reciprocating member being held out of contact with said cam by a holding force when the valve means is in the closed position, and
  (d) means for delaying the operation of the valve means from the open to the closed position whereby the pump means is operated for a predetermined period of time.

6. A windshield washing system for a vehicle having a windshield and a source of vacuum pressure comprising:
  (a) reservoir means for storing a supply of cleaning fluid,
  (b) nozzle means mounted on the vehicle forward of the windshield for directing cleaning fluid onto the windshield,
  (c) pump means operable to withdraw said fluid from said reservoir means and discharge fluid under pressure to said nozzle means,
  (d) valve means connecting the pump means with the reservoir means, said valve means normally in a closed position preventing the flow of cleaning fluid to said pump means and movable to an open position in response to vacuum pressure to permit the flow of fluid to said pump means, and
  (e) means operable to connect and disconnect the valve means with said source of vacuum pressure thereby moving said valve means to the open position.

7. A windshield washing system for a vehicle having a windshield and a source of vacuum pressure comprising:
  (a) reservoir means for storing a supply of cleaning fluid,
  (b) nozzle means mounted on the vehicle forward of the windshield for directing cleaning fluid onto the windshield,
  (c) motor means including a driven cam member,
  (d) pump means having a reciprocating member engageable with said cam member and operable to withdraw said cleaning fluid from said reservoir means and discharge fluid under pressure to said nozzle means, (e) valve means connecting the pump means with the reservoir means, said valve means normally in a closed position preventing the flow of cleaning fluid to said pump means to provide for the holding of said reciprocating member out of contact with said cam, said valve means movable to an open position in response to a vacuum pressure to permit the flow of fluid to said pump means, and (f) means operable to connect and disconnect the valve means with said source of vacuum pressure thereby moving said valve means to the open position.

References Cited in the file of this patent
UNITED STATES PATENTS

| | | |
|---|---|---|
| 2,672,293 | Ludlow | Mar. 16, 1954 |
| 2,966,044 | Mitchell | Dec. 27, 1960 |
| 2,992,448 | Simpson | July 18, 1961 |